US009104313B2

(12) United States Patent
Sivaraman et al.

(10) Patent No.: US 9,104,313 B2
(45) Date of Patent: Aug. 11, 2015

(54) AUTOMATIC ADJUSTMENT OF SELECTABLE FUNCTION PRESENTATION ON ELECTRONIC DEVICE DISPLAY

(75) Inventors: Sundar Sivaraman, Tirunelveli (IN); Maria M. Sagayaraj, Chennai (IN); NarayanaDhoss Gopalakrishnan, Chennai (IN); Ganesh Ramasamy, Chennai (IN); Poothabalan Somasundaram, Tirunelveli (IN); Arunkumar Surulinathan, Cumbum (IN); KrishnaKumar Sundaram, Chittode (IN); Habeeb AbdulQuiyum, Thondi (IN); Saravanan Vijayakumar, Kalayarkoil (IN)

(73) Assignee: Cellco Partnership, Basking Ridge, NJ (US)

( * ) Notice: Subject to any disclaimer, the term of this patent is extended or adjusted under 35 U.S.C. 154(b) by 370 days.

(21) Appl. No.: 13/617,969

(22) Filed: Sep. 14, 2012

(65) Prior Publication Data

US 2014/0082514 A1    Mar. 20, 2014

(51) Int. Cl.
| | | |
|---|---|---|
| *G06F 3/0482* | (2013.01) | |
| *G06F 3/0488* | (2013.01) | |
| *G06F 3/02* | (2006.01) | |
| *G06F 3/041* | (2006.01) | |
| *H04M 1/725* | (2006.01) | |

(52) U.S. Cl.
CPC .......... *G06F 3/04886* (2013.01); *G06F 3/0219* (2013.01); *G06F 3/0416* (2013.01); *G06F 3/0482* (2013.01); *H04M 1/72569* (2013.01); *H04M 2250/22* (2013.01)

(58) Field of Classification Search
CPC .................................................. G06F 3/04886
USPC ................... 715/745, 788, 798, 799
See application file for complete search history.

(56) References Cited

U.S. PATENT DOCUMENTS

| 4,291,198 | A | 9/1981 | Anderson et al. |
|---|---|---|---|
| 6,538,636 | B1 * | 3/2003 | Harrison ...................... 345/156 |
| 8,103,970 | B1 | 1/2012 | Allen et al. |
| 8,363,816 | B2 * | 1/2013 | Tsuei ............................ 379/242 |
| 8,368,658 | B2 * | 2/2013 | Brisebois et al. ............. 345/173 |
| 8,693,993 | B2 * | 4/2014 | Stifelman .................. 455/414.1 |
| 2003/0222923 | A1 * | 12/2003 | Li .................................. 345/815 |
| 2009/0228832 | A1 * | 9/2009 | Cheng ........................... 715/810 |
| 2010/0134423 | A1 * | 6/2010 | Brisebois et al. ............. 345/173 |

(Continued)

OTHER PUBLICATIONS

How to Use safari's Top Sites Page—For Dummies, 4 pages, Retrieved Aug. 29, 2012, <http://www.dummies.com/how-to/content/how-to-use-safaris-top-sites-page.html>.

(Continued)

*Primary Examiner* — Steven Sax
*Assistant Examiner* — David Choi

(57) ABSTRACT

An interface controller may control the way a function is presented for selection by a user interface in an electronic device. The interface controller may include a usage detection system configured to detect the way in which the electronic device is being or has been used. The interface controller may also include a presentation controller configured to automatically change the way in which the function is presented for selection by the user interface based on the way in which the usage detection system detects the electronic device is being or has been used.

23 Claims, 10 Drawing Sheets

(56) References Cited

U.S. PATENT DOCUMENTS

| | | | |
|---|---|---|---|
| 2012/0023452 A1* | 1/2012 | Li | 715/845 |
| 2013/0019205 A1* | 1/2013 | Gil et al. | 715/834 |
| 2013/0019206 A1* | 1/2013 | Kotler et al. | 715/834 |
| 2013/0024815 A1* | 1/2013 | O | 715/811 |
| 2014/0082514 A1* | 3/2014 | Sivaraman et al. | 715/745 |

OTHER PUBLICATIONS

Safari 4 for Windows, <http://support.apple.com/kb/HT3657>, Retrieved on Aug. 29, 2012.

Make Your Mouse Pointers Left-Hand Friendly—Hoe-To Geek, <http://www.howtogeek.com/howto/15833/make-your-mouse-pointers-left-hand-friendly>, Retrieved on Aug. 29, 2012.

* cited by examiner

AUTOMATIC ADJUSTMENT OF SELECTABLE FUNCTION PRESENTATION ON ELECTRONIC DEVICE DISPLAY

DESCRIPTION OF RELATED ART

Electronic user devices have become quite common in everyday life; and as the devices and capabilities become increasingly sophisticated, the user must navigate through an ever more complicated array of available options, functions, applications and the like via the user interface. Many of these devices are small and portable, which dictates that the user interface elements are small and lightweight. Smaller user interface elements, however, further complicate the challenges of user navigation through the myriad capabilities of the device.

Various functions may be selected through the use of elements in a user interface of an electronic device for activation in the electronic device. User activation of the function may be through any of a number of methods, such as by selecting an image of a button or a menu entry on a display of the electronic device, for example, using a mouse or touchpad to move a cursor and a key press or 'click' to select an item indicated by the cursor, or as another example, using a touch of the button or entry on a touchscreen type display device. The function, location, and size of the selectable elements in the user interface are commonly dictated by the designer of the user interface, such as an application program developer, based on the capabilities of the physical elements of the user interface and the fundamental capabilities of the user interface dictated by the operating system or the like. However, these functions, locations, and sizes of selectable elements offered via the user interface may not be ideal for every user or for every pattern of use.

For example, a user of a touchscreen type smart phone who holds the phone in her left hand will usually find it easier to press an "Answer" call button when the button is on the right side of the screen, while a user of the same smart phone that holds the phone in his right hand will usually find it easier to press the "Answer" call button when the button is on the left side of the screen. Similarly, one user of a smart phone may frequently use a navigation application and thus may prefer that the icon that launches this application be in a top level menu or home screen, while another user of the same phone may rarely use this navigation application and thus may prefer that its launch icon be presented in a lower level menu while icons for other more often used applications appear in that user's home screen or top level menu.

Systems have been designed that permit users to selectively configure these display elements. For example, an operating system of a personal computer (PC) may allow a setting of mouse button properties to reverse the function of the two buttons so as to configure the electronic device, i.e., the PC with the mouse, for a left handed user. Other types of devices or their operating systems have allowed users to move icons or other identifiers for applications or the like around to selectively change placement thereof on various screens or menus used to selectively activate the device functions. However, many users may not have the time or inclination to learn about and utilize these controls. Still further, the needs of the same user can change over time, making such selections no longer optimal. In addition, if the device is used by multiple users, such as different members in a family, the selections for one user may not be appropriate or desirable for other users.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

An interface controller may control the way a function is presented for selection by a user interface in an electronic device. The interface controller may include a usage detection system configured to detect the way in which the electronic device is being or has been used. The way in which an electronic device is used may be a physical manner of usage, such as which of the user's hands is holding the device during operation. Alternatively, the way in which an electronic device is used may be a current functional state or a pattern of prior usage, such as a history of device usage over time.

The interface controller may also include a presentation controller configured to automatically change (i.e., without a user manually directing the change) the way in which the function is presented for selection by the user interface when the electronic device is being or has been used in one or more particular ways. For example, the presentation controller may cause the device to display functional objects in an arrangement oriented in correspondence to current orientation of the electronic device, and at positions within the arrangement in accordance with the way in which the electronic device has been used without adjusting an orientation of the entire display. Each respective functional object represents a different function to be performed by the electronic device in response to user selection of the respective functional object from the displayed arrangement. The presentation controller automatically changes positions of at least two of the functional objects or replaces at least one of the functional objects with at least one previously unavailable functional object, within the displayed arrangement still oriented to correspond to the current orientation of the electronic device, responsive to detection of a change in the way the electronic device currently is being used. In such an example, the automatic change is other than to merely change the orientation of an electronic display to match the current orientation of the electronic device, change the placement of web links on a frequently used page or a frequently used menu, or change appearance of a user-selectable control on a display following the selection of any user-selectable control.

Figure 1:
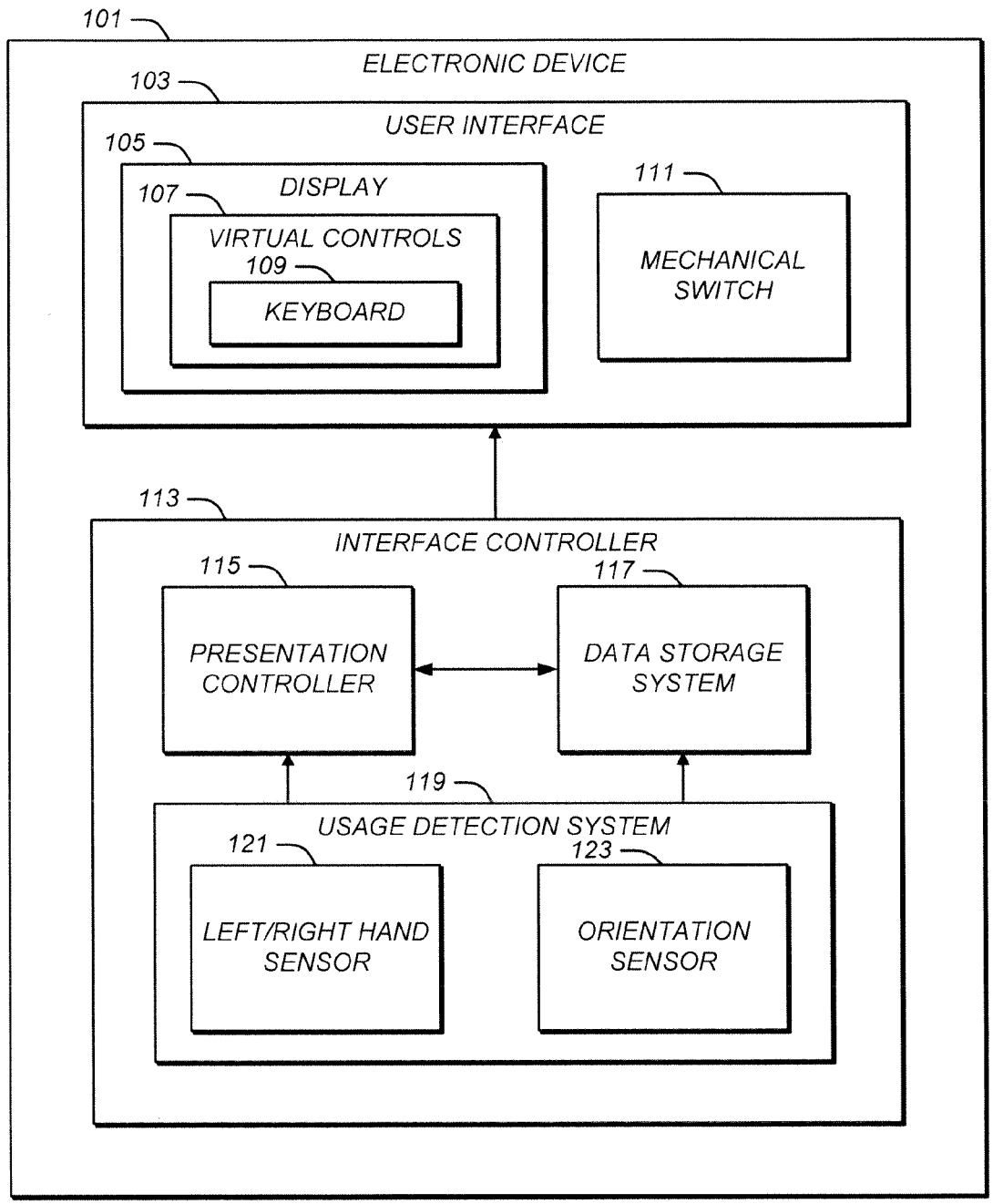
FIG. 1 illustrates an example of an electronic device with a presentation controller that automatically changes the way in which a function is presented for user selection, when the electronic device is being or has been used in one or more particular ways.

FIG. 1 illustrates an example of an electronic device 101 with a presentation controller 115 that automatically changes the way in which a function is presented on a display 105 of the electronic device for user selection, when the electronic device is being or has been used in one or more particular ways. As illustrated in FIG. 1, the electronic device 101 includes a user interface 103 and an interface controller 113.

The user interface 103 may include any type of user interface device, such as a touchscreen type display 105 and a mechanical switch 111. Although not shown, a keypad or keyboard and/or a pointing device may be provided in addition to the touchscreen display or in combination with a non-touch implementation of the display. The mechanical switch 111 may be disposed at any location in the device, such as along one side of a rectangular, cuboid-shaped smart phone.

In our examples, the display 105 may be a touchscreen that displays information and receives user input by a user contacting demarcated areas on the display. For example, a device incorporating a touchscreen may include the physical display, a display driver circuit, a touch/position sensor overlaid on a face of the display, and associated driving and sensing circuitry. The touch/position sensor is relatively transparent, so that the user may view the information presented on the display. Capacitive and other sensor types are known. The associated sensing circuitry or controller senses signals from elements of the touch/position sensor and detects occurrence and position of each touch of the screen formed by the display and sensor. The sensing circuitry provides touch position information to the device processor, which correlates that information to the information currently displayed via the display to determine the nature of user input via the screen. Tracking of touch over time can be interpreted as a gesture and different sensed gestures can be interpreted as different types of user inputs.

A touchscreen display can offer a variety of visible user-selectable input elements, for example, in the form of various virtual controls 107. One of these virtual controls 107 may be a virtual keyboard 109. Using the virtual keyboard 109 as an example, the processor causes the driver to operate the display to show the keyboard on the screen. When the user touches the screen in the area of a displayed key, as a selection of that key, the touch/position sensor senses the touch, and the sensing circuitry responds to provide touch position information to the device processor. The processor correlates that information to the information about the keyboard currently displayed via the display to determine the particular virtual key that the user touch-selected.

The interface controller 113 includes the presentation controller 115, a data storage system 117, and a usage detection system 119. The usage detection system 119 includes a sensor. In some embodiments described later, the usage detection system 119 may include a left/right hand sensor 121 and an orientation sensor 123, for example when the electronic device 101 is a hand-held device. In other cases discussed more later, usage may also be detected in response to sensed inputs via a user interface input sensor such as the touch sensor of a touchscreen display, a keypad or the like. The principles outlined above relative to FIG. 1 may be adapted to a variety of electronic devices using various configurations of hardware and software to implement any or all of the elements shown in the drawing. For example, the interface controller 113, the elements 115 and 117, and functional aspects of the elements 119 to 123 (which respond to sensor hardware) may be implemented with hardware, software, or a combination of hardware and software. Typically, the data storage system 117 would be a hardware element; although a processor (not shown) accessing the storage system would typically execute programming instructions to control reading from and writing to the data storage system. General device usage detection functions can be implemented by software running on a device processor in response to user inputs. If implemented algorithmically, the left/right hand sensor 121 may be similarly implemented by appropriate programming. In a more specific example, the sensor 121 may be a combination of one or more hardware type detectors in combination with electrical circuitry; and the device processor would be appropriately programmed to process and respond to data from the circuitry of the sensor 121. Similarly, the orientation sensor 123 would be a combination of appropriate detector(s) and circuitry; and the device processor would be appropriately programmed to process and respond to data from the circuitry of the sensor. A Micro-Electro-Mechanical System (MEMS) for use in a smart phone or the like includes detectors and circuitry to sense orientation, movement, and direction.

The electronic device 101 may be of any type. For example, the electronic device 101 may be a computer, such as a desktop computer or a wireless mobile communication device, such as a cellphone, smart phone, laptop computer, notebook computer, or tablet computer. The electronic device 101 may be hand-held, such as a cellphone, smart phone, or tablet computer.

The user interface 103 is configured to present various functions of the electronic device for selection by a user. In a processor based device implementation, programming defines the graphical user interface including how and where various selectable functions or files appear on the display or how the user operates the device to select particular items and responses to user selections. Functions may be selected, for example, by activating one of the virtual controls 107, such as one of the keys on the virtual keyboard 109, a virtual button, or a selection on a hierarchical menu; a mechanical switch, such as the mechanical switch 111; a key on a real keyboard; or a key or button on a mouse.

The usage detection system 119 is configured to detect the way in which the electronic device 101 is being used, such as which function has been selected by the user; whether a hand-held electronic device is being held in the right or left hand; the orientation of the electronic device 101; and/or whether a selected function works properly. The usage detection system 119 may also (or instead) be configured to detect the way in which the electronic device 101 has been used when the electronic device 101 was being used. Information about the previous usage detected by the usage detection system 119 may be stored and employed subsequently to adjust current functionality of the electronic device 101 and the associated presentation of one or more of the available functions. Thus, the usage detection system 119 is configured to detect the way in which the electronic device 101 is being used and/or has been used.

The left/right hand sensor 121 is configured to sense whether the electronic device 101 is being held by the left or right hand of a user. The left/right hand sensor 121 may be of any type. For example, the left/right hand sensor 121 may include one or more capacitive detectors, photocells, touch switches, heat detectors, and/or other type of detectors that are strategically positioned at locations on the hand-held electronic device 101 (e.g., on both sides of the electronic device 101 and substantially flush with the surface of each side), with associated sensing circuitry (if appropriate) to detect the locations at which one or more fingers and/or other portions of a hand of a user touch the electronic device 101. The locations at which the left/right hand sensor(s) 121 detect touching by points of a user's hand, in turn, may be converted by circuitry associated with the left/right hand sensor 121 into information indicative of whether the electronic device 101 is being held by a left or a right hand. For example, two detectors may be used on one side of the electronic device 101 such that if only one detects user contact, fingers are determined to be on the other side (logical AND of the detectors). This can be confirmed by using detectors on the other side of the electronic device 101 (e.g., a logical AND on one side may correspond to a logical NAND for the detectors on the other side). The sensor(s) on each side of the device, when used, may include associated detection circuitry that determines whether a single digit (e.g., a thumb) or multiple digits (e.g., two fingers) are touching. Any case that is placed over the electronic device 101 may include openings for each of the sensors to enable, when needed, direct contact between the sensor and a hand or fingers.

The usage detection system 119 may in addition or instead present an option to the user that enables the user to specify whether the hand-held electronic device 101 should be configured for being held in a left or a right hand. The device may be configured to retain the selection made by the user until it is changed by the user, for a pre-determined period, until the device is turned off, or for some other time length. In the event of an inconsistency between the hand that is detected to be holding the electronic device and this user setting, the system may be configured to give preference to the user setting, the detected use, or to present the question to the user for resolution (e.g., providing a notification of the inconsistency and requesting confirmation of the user setting).

The orientation sensor 123 is configured to sense the orientation of the hand-held electronic device. The orientation sensor 123 may be of any type. For example, the orientation sensor 123 may be an accelerometer that can detect the direction of gravity. In a smart phone or tablet, for example, an accelerometer may be an element of a Micro-Electro-Mechanical System (MEMS). The detected direction may be converted by circuitry of the orientation sensor 123 into information indicative of the orientation of the hand-held electronic device for use by other elements of the device, including use by the interface controller 119.

The usage detection system 119 may be configured to detect other ways in which the electronic device is being used, such as the temperature or lighting of the environment in which the electronic device 101 is being used (a temperature and light sensor, respectively, may be used for this purpose), and/or the selections and/or data entries that are made by its user. The usage detection system 119 may be configured to store information about some or all of this detected activity in the data storage system 117.

The data storage system 117 may be of any type. For example, the data storage system 117 may include one or more memory devices, such as one or more flash or solid-state memories, RAMS, and/or disk drives.

The presentation controller 115 is configured to automatically change (i.e., without a user manually directing the change) the way in which one or more functions of the electronic device are presented for selection by the user interface 103 when the usage detection system 119 detects the electronic device 101 is being or has been used in one or more particular ways, such as one or more of the ways discussed above and/or discussed below.

When changing the way in which one or more functions are presented for selection based on the way in which the electronic device 101 has been or is being used, the presentation controller 115 is configured to seek historic information about the way in which the electronic device 101 has been used from the data storage system 117. Usage data that exceeds a specified age may be automatically removed from the data storage system 117 or excluded from use by the presentation controller 115. The age may be specified by the user, by the manufacturer, or in any other way. The specified age may be purely temporal (e.g., usage patterns older than a particular period of time, such as a week) and/or based on amount of usage (e.g., usage patterns prior to the last ten times the particular function was used on the electronic device 101).

The presentation controller 115 may be configured to automatically dictate changes based on the degree to which the electronic device 101 has been used in one or more particular ways, examples of which are described below. For example, the presentation controller 115 may be configured to automatically dictate a change in the way in which one or more functions are presented for selection by the user interface 103 when the information in the data storage system 117 indicates that the frequency and/or number of times the electronic device 101 has been used in one or more particular ways has reached or exceeded a first threshold, such as to make that function easier for the user to access. Similarly, the presentation controller 115 may be configured to automatically dictate a change in the way in which one or more functions are presented for selection by the user interface 103 when the information in the data storage system 117 indicates that the frequency and/or number of recent times the electronic device 101 has been used in one or more particular ways has not reached or exceeded a second threshold, such as to make that function harder for the user to access, while making other functions easier to access. The second threshold may be the same as or different than the first threshold, such as less than the first threshold. Examples of usage levels and the attendant changes that the presentation controller 115 dictates as a consequence described below may make the presentation of one function more prominent or convenient to access based on relatively high usage and/or may make the presentation of another function less prominent or convenient to access based on relatively low usage.

Figure 1A:
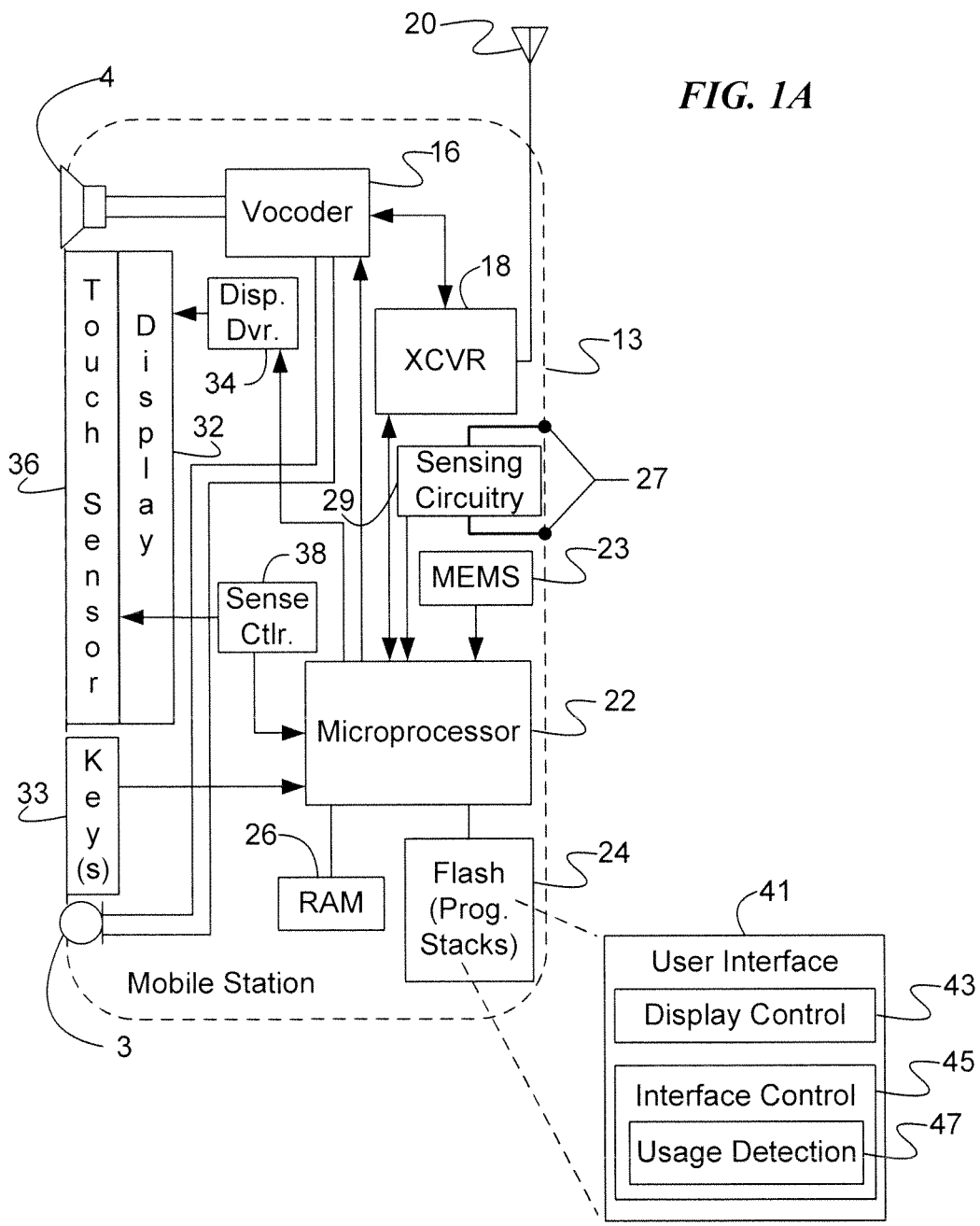
FIG. 1A illustrates a high level simplified function block diagram of an exemplary electronic device, in this case, a smart phone with a touchscreen type physical user interface.

As shown by the discussion of the method of FIG. 1, the usage based interface configuration technique can be adapted to a variety of different types of electronic devices 101, one example of which is a touchscreen type smart phone. To fully appreciate that example, it may be helpful to consider the elements of such a device at a high level. For purposes of such a discussion, FIG. 1A provides a block diagram illustration of an exemplary smart phone 13, a device that may be configured to operate as discussed above relative to the electronic device 101 of FIG. 1.

The smart phone 13 may function as a normal digital wireless telephone station. For that function, the smart phone 13 includes a microphone 3 for audio signal input and a speaker 4 for audio signal output. The microphone 3 and speaker 4 connect to voice coding and decoding circuitry (vocoder) 16. For a voice telephone call, for example, the vocoder 16 provides two-way conversion between analog audio signals representing speech or other audio and digital samples at a compressed bit rate compatible with the digital protocol of wireless telephone network communications through mobile communication network and possibly voice over packet (Internet Protocol) communications if supported by the smart phone 13 and the data services through the mobile communication network.

For digital wireless communications, the smart phone 13 also includes at least one digital transceiver (XCVR) 18. The transceiver (XCVR) 18 could be a multimode transceiver, or the mobile smart phone 13 may include two or more transceivers each of which supports a subset of the various technologies or modes. The concepts discussed here encompass embodiments of the mobile smart phone 13 utilizing any digital transceivers that conform to current or future developed digital wireless communication standards.

The transceiver 18 provides two-way wireless communication of information, such as vocoded speech samples and/or digital message information, in accordance with the technology of a wireless communication network, such as a cellular public network and/or a WiFi type hotspot network. The transceiver 18 also sends and receives a variety of signaling messages in support of the various voice and data services provided via the smart phone 13 and the communication network, in this case. Each transceiver 18 connects through RF send and receive amplifiers (not separately shown) to an antenna 20. In the example, the transceiver 18 is configured for RF communication in accord with a digital wireless protocol, such as the current WiFi, LTE, CDMA and 3GPP protocols.

The smart phone 13 includes a display 32 for displaying messages, menus or the like, call related information dialed by the user, calling party numbers, etc. The display 32 corresponds to the display 105 in the example of FIG. 1. The display 32 outputs visual information in response to driver signals from an appropriate display driver circuit 34.

The smart phone 13 is an example of a touchscreen type device; therefore the phone 13 also includes a touch sensor 36. The touch sensor 36 is relatively transparent, so that the user may view the information presented on the user interface (i.e., display) 32. A sense controller 38 provides drive signals if necessary to the particular type of sensor 36 and senses signals from elements of the touch sensor 36. In response to the sensed signals, the sense controller 38 detects occurrence and position of each touch of the screen formed by the display 32 and touch sensor 36. The sense controller 38 provides touch position information to the microprocessor 22, which correlates that information to the information currently displayed via the display 32, to determine the nature of user input via the screen.

The display 32 and touch sensor 36 (and possibly one or more keys 33, if included) are the physical elements providing the textual and graphical user interface for the smart phone 13. The microphone 3 and speaker 4 may be used as additional user interface elements, for audio input and output. Of course, other user interface elements may be used, such as a keypad, keyboard, and/or trackball, as in some types of smart phones or tablets.

Smart phone 13 may also include a haptic element (not shown) to provide haptic feedback to the user. Various combinations of the one or more keys 33, display 32, microphone 3, haptic element, and speaker 4 may be used as the physical input/output elements of the graphical user interface (GUI), for the various device functions. Of course, other user interface elements may be used. These elements provide both outputs to the device user and one or more mechanisms for inputs from the user. Of particular note, the display 32 and the touch sensor 36 provide a display and a mechanism for user selection of displayed functions. If provided, a key, such as a 'home' key, may correspond to the mechanical switch 111 in the example of FIG. 1.

The smart phone 13 also includes one or more detectors and associated sensing circuitry for determining device orientation forming an orientation sensor, like the sensor 123 in the earlier example. In the example of FIG. 1A, this sensor is implemented in the MEMS 23.

For left/right hand sensing, the smart phone 13 also includes detectors 27 at appropriate points on the outer housing of a type and at locations as outlined in the discussion of sensor 121 above. Electrical sensing circuitry 29 processes signals from the detectors 27 and provides information as to the position(s) where a user's hand contacts the device 13, for use in determining whether the user is operating the device 13 right handed or left handed.

In the example of FIG. 1A, a microprocessor 22 serves as a programmable controller or processor for the smart phone 13, in that it controls all operations of the smart phone 13 in accord with programming that it executes. In the example, the smart phone 13 includes flash type program memory 24, for storage of various "software" or "firmware" program routines and mobile configuration settings, such as mobile telephone number (MTN or MDN), etc. The smart phone 13 may also include a non-volatile random access memory (RAM) 26 for a working data processing memory. In a present implementation, the flash type program memory 24 stores firmware such as a boot routine, device driver software, an operating system, call processing software and vocoder control software, and any of a wide variety of other applications, such as a navigation application, client browser software, and short message service software. The memories 24, 26 also store various data, such as telephone numbers and server addresses, downloaded data such as multimedia content, and various data input by the user. Programming stored in the flash type program memory 24 is loaded into and executed by the microprocessor 22.

Of note for purposes of this discussion, the programming in the memory 24 includes executable instructions for the processor to configure the device 13 to implement functions related to the user interface, as represented generally by the user interface program 41 stored in memory as shown in FIG. 1A. The user interface programming 41 includes programming 43 to control the display, e.g., to provide a baseline set of function/icon/menu displays and to modify the display in response to various user inputs, device operational states, and the like. In a smart phone example, the programming 43 enables the microprocessor 22 to control the display 32 through driver 34, so that the display presents virtual controls, such as a virtual keyboard, like the controls 107 and keyboard 109 of FIG. 1.

Aspects of the user interface, for example configuration of the displayed information and/or outputs responsive to various user and other device inputs, are controlled by microprocessor execution of the interface control programming instructions generally shown at 45 in the drawing. In this way, the device 13 implements functions similar to those of the interface controller 113 in the example of FIG. 1. For example, the interface control program 45 includes usage detection programming 47. Execution of instructions included in the programming 47 causes the microprocessor 22 to track various usage related events during operations of the device 13. The tracking, for example, may include tracking of selection and operations of various functions/files on the device via the touchscreen interface. Related data storage is available in flash memory to implement the functions associated with the data storage system 117.

The programming 47 also configures the microprocessor 22 to respond to detected orientation information from the MEMS 23 as well as hand contact information from sensing circuitry 29 for determination of left/right hand operation. In this way, the MEMS 23 and related processor operations controlled by the programming 47 implement the functions of the orientation sensor 123 in the example of FIG. 1. Similarly, the detectors 27 and the sensing circuitry 29, together with related processor operations controlled by the programming 47, implement the functions of the left/right hand sensor 121 in the example of FIG. 1. The programming 47 also configures the microprocessor 22, via interaction with the display control program 43, to the control the outputs of the user interface, particularly via the display 36, based on the various usage related detections.

Hence, the functionality of the device 13, controlled by processor execution of the usage detection programming 47, corresponds to the functions of the usage detection system 119 in the example of FIG. 1. For example, the programming enables the processor 22 to process information from the circuitry 29 to determine right handed or left handed operation. The processor may also use the orientation information from the MEMS 23. The usage detection related programming 47 also configures the processor 22 to track and store various other device usage information such a time, duration and frequency of usage of various selectable functions. Based on various aspects of detected usage, the programming 45, 47 also configures the processor 26 to implement the usage related presentation controller functions, for example, to change the position of displayed virtual buttons or keys or to change the information displayed in association with displayed virtual keys (and thus the associated function if selected) based on information obtained from the usage detection system functionality.

Figure 2:
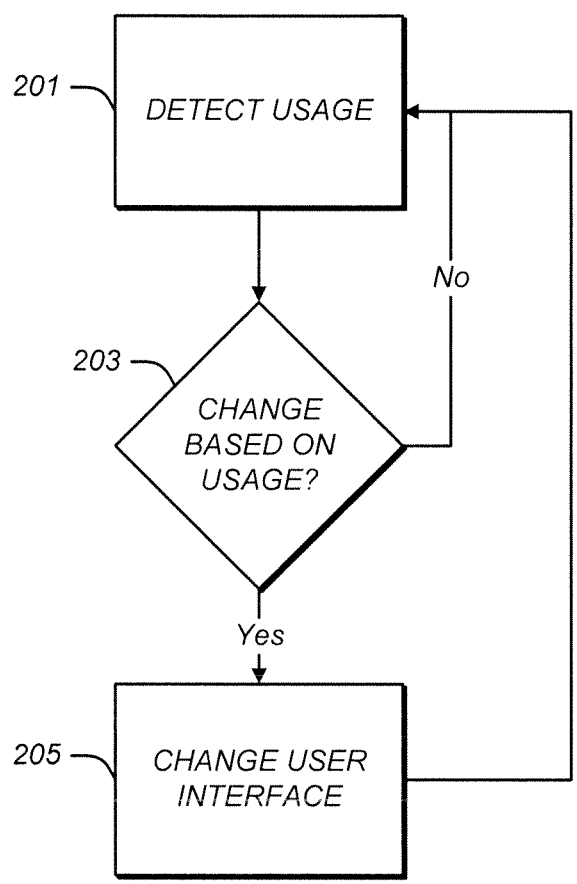
FIG. 2 illustrates an example of a process for automatically changing the way in which a function is presented by the electronic device for user selection based on the way in which the electronic device is being used.

FIG. 2 illustrates an example of a process for automatically changing the way in which a function is presented by the electronic device 101 of FIG. 1 for user selection based on the way in which the electronic device 101 is being or has been used. The process begins by the usage detection system 119 detecting the way in which the electronic device 101 is being used, as reflected by a Detect Usage step 201. Examples of such usages are described below. The presentation controller 115 then determines whether this detected usage meets at least one change criterion that the presentation controller 115 has been configured to respond to with a user interface change, as reflected by a Change Based on Usage? decision step 203. If so, the presentation controller 115 causes the change, as reflected by a Change User Interface step 205. If not, or after a change has been made, the process repeats, as is also reflected in FIG. 2. The process illustrated in FIG. 2 may repeat continuously while the electronic device 101 is being used. Each time the presentation controller 115 dictates a change, that change may continue to be implemented until the presentation controller 115 dictates a different change, following the process that has just been described.

The presentation controller 115 may be configured to automatically change the way in which a function is presented for selection on the user interface 103 based on whether a left or a right hand is holding a hand-held electronic device, as detected by the usage detection system 119. In a smartphone example, the presentation controller 115 may be configured to automatically change the side of a display on which a user-selectable control is presented for selection so that the selectable control is provided on one side before the change and on the opposing side after the change. "Side" is intended to mean a location that is offset laterally from the center of the display, for example, offset horizontally with respect to when the device is held so as to present a substantially vertical orientation of the display. The presentation controller 115 may be configured to automatically make this change when the usage detection system 119 detects that a user is holding the smart phone in a hand that is on the same side of the user's body as the side of the display in the smart phone on which the user-selectable control is presented. In other words, the presentation controller 115 may be configured to automatically cause a user-selectable control to appear on the side of a display that is opposite of the side of the body to which the hand holding the smart phone is attached.

The interface controller 113 may be configured to initiate configuration changes like at 205 more or less instantaneously in real time in response to detected usage dictating a change at 203. For example, interface controller 113 may change the position of virtual buttons on the display when there is a detection of a change in the hand (left to right or right to left) that is used to hold the electronic device 101. However, for some or all types of detected changes, the interface controller 113 may be configured to delay initiation of configuration changes for some period of time to determine if the change persists (for example, by a timing function included in the logic implementing the decision step 203). Using the hand detection example, some users may prefer that the interface controller 113 not make changes each and every time there is a detection in the change of the hand holding the device, so that if the user changes for a short time for convenience and then changes back to the most often used hand, the device 101 does not keep toggling back and forth from one configuration to the other. In such a case, interface controller 113 may determine that a change is needed if the detected left/right hand condition changes and persists for a predetermined amount of usage (e.g., over a pre-determined time period such as several minutes or number of times the buttons are pressed while held with the same hand) before changing the display configuration.

Figure 3A:
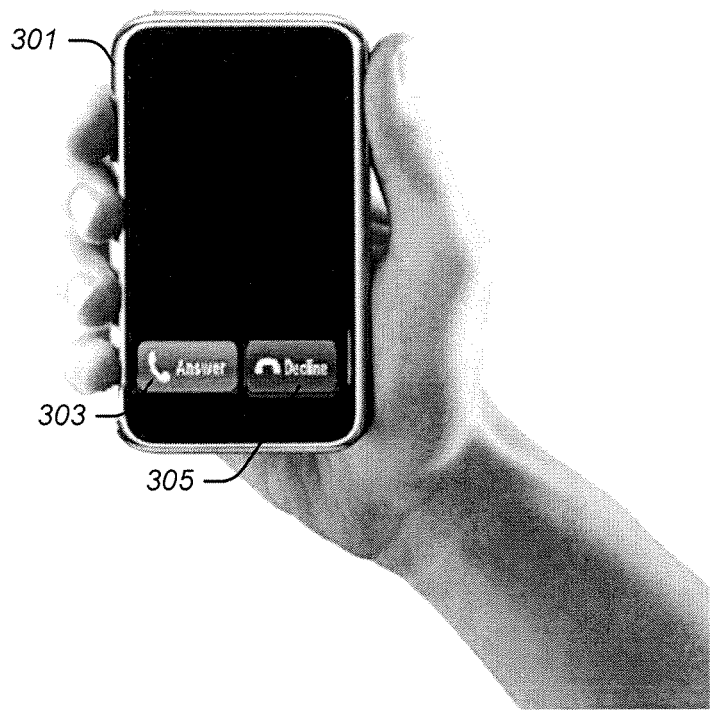
FIGS. 3A and 3B illustrate examples of the positions of a virtual Answer button and a virtual Decline button on a display in a touchscreen type smart phone being automatically changed by the presentation controller based on whether the smart phone is being held in a right hand (FIG. 3A) or a left hand (FIG. 3B).
Figure 3B:
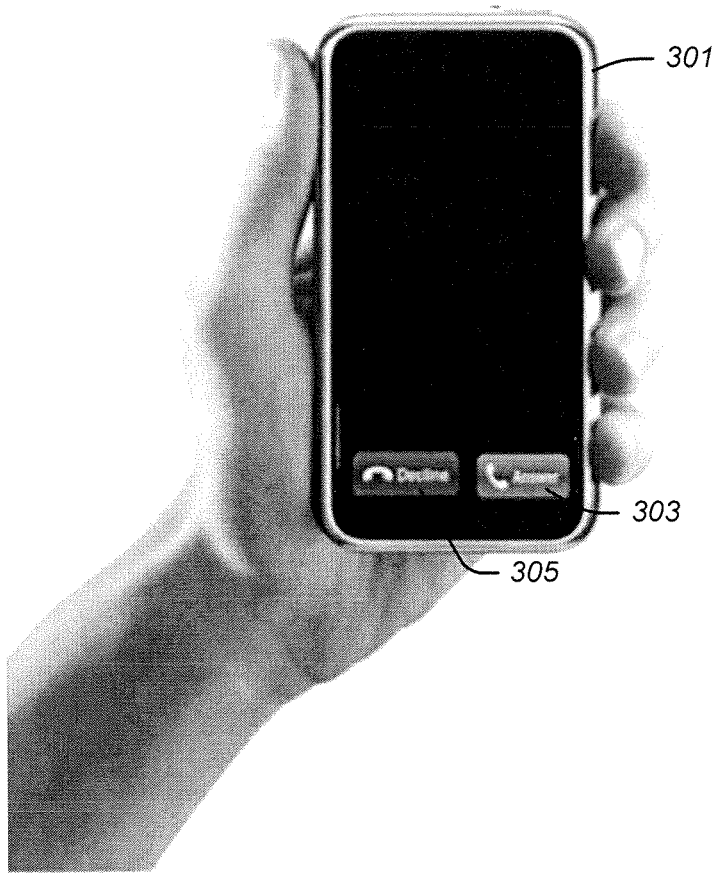

FIGS. 3A and 3B illustrate examples of the positions of a virtual Answer button 303 and a virtual Decline button 305 on a display in a touchscreen type smart phone 301 being automatically changed by the presentation controller 115 based on whether the smart phone 301 is being held in a right hand (FIG. 3A) or a left hand (FIG. 3B). As illustrated in these figures, the presentation controller 115 causes the virtual Answer button 303 to always appear on the side of the display that is opposite of the side of the body from which the holding hand is attached. This configuration makes use of the fact that a user normally finds it easier to press the virtual Answer button 303 when it is closest to the hand that is not holding the smart phone 301. This configuration may be useful for users that usually answer incoming calls. For users that usually decline incoming calls, on the other hand, the presentation controller 115 may instead be configured to always place the virtual Decline button 305 in the closer position. In other embodiments, the side in which virtual slidebars, for example for unlocking and vibration/silent mode, may be adjusted based on the detected handedness.

In these examples, the virtual button that is used most often is moved to the position that is believed most convenient as a function of the hand that is currently used to hold the electronic device. The determination of which function is used most often may be based on the greater number of times that a user selects one function in comparison to another or based on a higher usage of one or the other function exceeding a percentage threshold. If percentage based, the percentage may be with respect to total incoming calls or with respect to just those incoming calls to which the user selects between the two available functions.

Figure 4A:
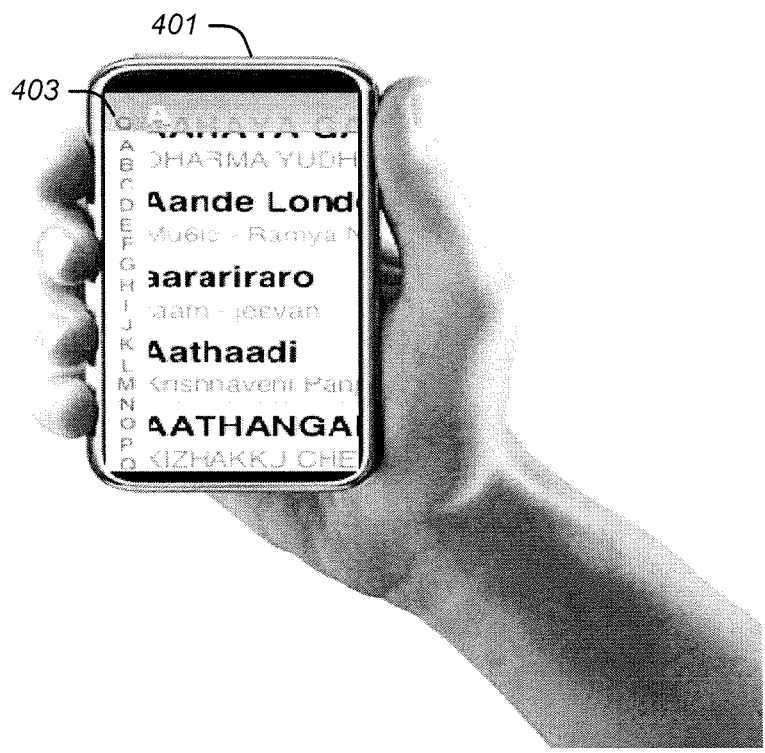
FIGS. 4A and 4B illustrate examples of the position of a virtual set of buttons on a display in an smart phone being automatically changed by the presentation controller based on whether the touchscreen type smart phone is held in a right hand (FIG. 4A) or a left hand (FIG. 4B).
Figure 4B:
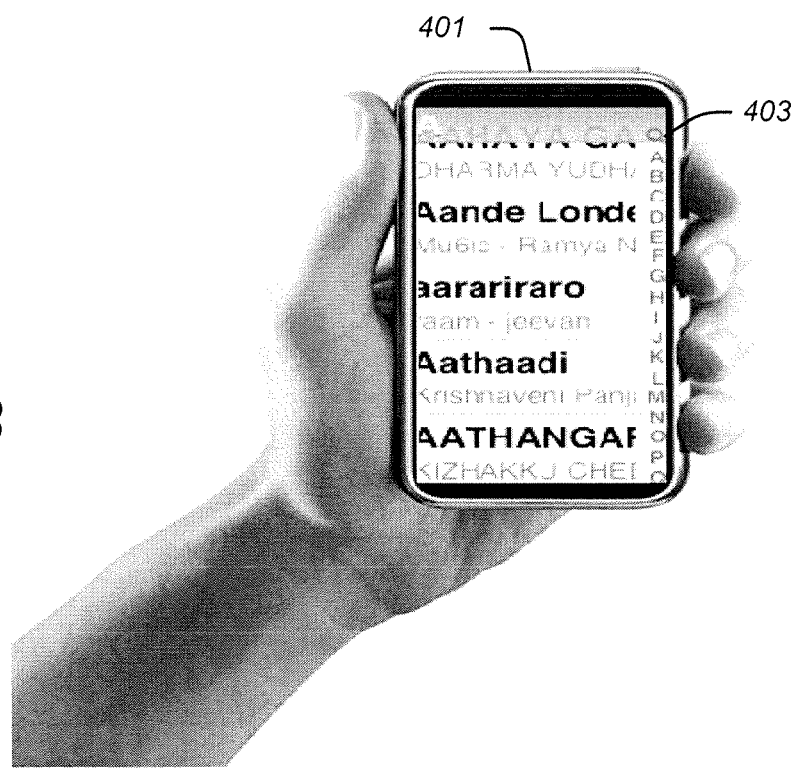

FIGS. 4A and 4B illustrate examples of the position of a virtual set of letter-buttons 403 arranged as a column to one side or the other on a display in a smart phone 401. Each letter-button constitutes the first letter of the last name(s) of one or more contacts in a stored contact list; and each letter button 403 may be selected to cause contacts beginning with that letter for a last name to be displayed. The position of the set of letter-buttons 403 is automatically changed by the presentation controller 115 based on whether the smart phone 401 is held in a right hand (FIG. 4A) or a left hand (FIG. 4B). The configuration may be the same as discussed above in connection with FIGS. 3A and 3B, except that the user-selectable control that is moved closest to the selecting hand may be a set of virtual buttons, rather than a single virtual button. However, the thresholds for changing left/right may be different, due to the inherent differences in functional requirements of operation. For example, answering 5 phone calls using a left hand may result in the Answer button being shifted from one side to another as in FIGS. 3A and 3B. Typing in 5 letters to find a contact name, however, may not result in a configuration change regarding presentation of a contact list or search, whereas five name inputs (regardless of number of letters) may result in such a configuration change.

FIG. 2 illustrates an example of a process for automatically changing the way in which a function is presented based on the way in which the electronic device is being used, at a fairly high level and may be implemented in a variety of specific ways. In some examples, the process of FIG. 2 may be implemented in a real time, continuously reactive approach, for example, to change the arrangement of the function presentation rapidly in response to detect a change of which of the user's hands is holding the electronic device. However, other examples of such a process may be based on history of usage, e.g., frequency of selecting a particular functional object to activate a device function or application. It may be helpful to consider an example of this later type of procedure in somewhat more detail.

Figure 5:
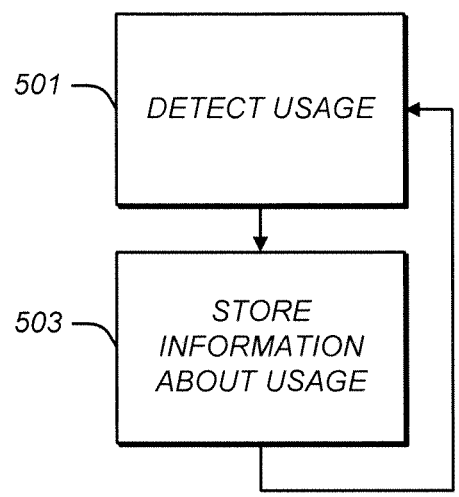
FIG. 5 illustrates an example of a process for detecting and storing ways in which the electronic device has been used.
Figure 6:
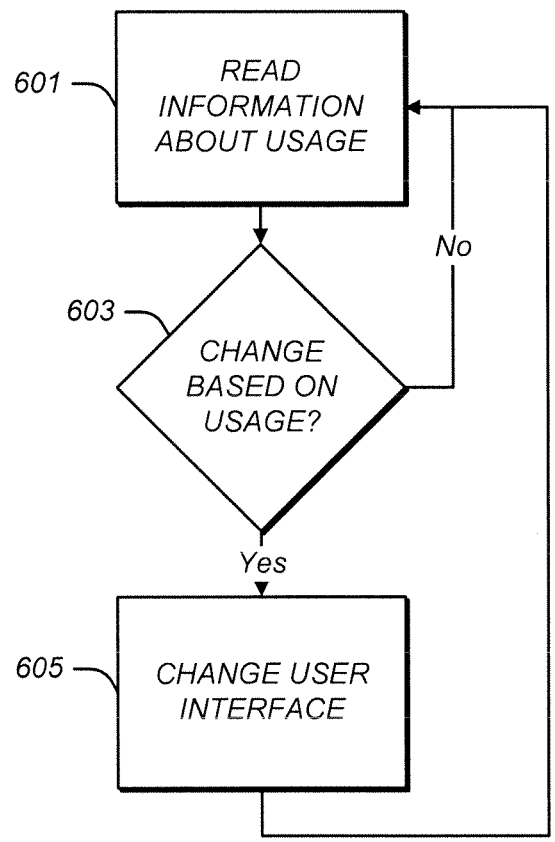
FIG. 6 illustrates an example of a process for automatically changing ways in which functions are presented for user selection by the electronic device based on ways in which the electronic device has been used.

FIG. 3 illustrates a generic process that may be used in connection with changes that do and do not rely upon any usage history. FIGS. 5 and 6 (discussed below), on the other hand, illustrate more specific processes that store (FIG. 5) and rely upon (FIG. 6) a usage history.

FIG. 5 illustrates an example of a process for detecting and storing ways in which the electronic device 101 has been used. The process begins by the usage detection system 119 detecting a way in which the electronic device 101 is being used, as reflected by a Detect Usage step 501. For example, the usage detection system 119 may be configured to detect each time a real or virtual button is pressed, such as by intercepting an interrupt from a central processing system. Other examples of such ways are described above and below. The usage detection system 119 may be configured to monitor this usage at all times while the electronic device is operating or at some lesser amount of times specified by a user or the manufacturer.

The usage detection system 119 then causes information indicative of the way that the device has been used to be stored in the data storage system 117, as reflected by a Store Information About Usage step 503. The monitoring or tracking may run fairly continuously during operations of the electronic device. The information that is stored may depend upon the user interaction that is being captured. For example, the stored information may be placed in a table and include the details of the user interaction, such as when the application that experienced the user interaction began, the time of the user interaction, the exact nature of the user interaction (including the number of touches or clicks and exactly what was touched or clicked), and the amount of time the application was open. This data may then be analyzed to determine whether a particular type of usage has exceeded a threshold or fallen below the same or a different threshold, the thresholds being set at levels that warrant changes in the user interface to be made as a result. These tables may be examined periodically, such as every five days, each time the device is powered up, on user demand, and/or based on a different schedule. The usage detection system 119 may limit the storage of information about the ways the electronic device 101 is being used to just information about particular ways, such as those particular ways that cause the presentation controller 115 to change the way a function is presented for selection.

For example, two flat files or two tables may be used to store the usage information. A first file/table may track each session during which an application is used. For example, it may store the name of the application, the duration of its usage, and the number of times each possible input option is selected or otherwise used. This information may be gathered while the application is being used and placed in the first file/table when the user exits the application.

The second file/table may store cumulative information about all uses of the application, such as its name, its total number of hits, its total open time (duration), and its calculated rank. At the end of each day, the data inside the first file/table may be taken and processed to get the total hits for the application and the total time taken (duration) for the application. This processed data (i.e., application name, total hits, total time taken) may be added to the second file/table. Once the data inside the first file/table is processed, all the data inside the first file/table may be deleted. The ranking data within the second file/table may then be re-processed and updated correspondingly. Based on the rankings in the second file/table, the locations of icons and other interface elements may be adjusted.

FIG. 6 illustrates an example of a process for automatically changing ways in which functions are presented for user selection by the electronic device 101 based on ways in which the electronic device 101 has been used. The process begins by the presentation controller 115 reading historic information about ways in which the electronic device 101 has been used, as reflected by a Read Information About Usage step

601. As noted earlier, the history of usage data may be limited as to age and/or based on amount of usage (e.g., usage patterns prior to the last ten times the particular function was used on the electronic device 101).

The presentation controller 115 next determines whether a change should be made in the way a function has been presented for selection based on the historic information that was read, as reflected by a Change Based On Usage? decision step 603. As indicated above, such a change may be dictated when the information in the data storage system 117 indicates that the frequency and/or number of times the electronic device 101 has been used in one or more particular ways has and/or has not been reached or exceeded a threshold. If a change is to be made, the presentation controller 115 causes the change, as reflected by a Change User Interface step 605. If a change is not to be made, or after a change has been made, the process repeats. The analysis to determine what changes should be made based on the history of usage may repeat periodically. For example, at a set interval, such as every minute, every 30 minutes, every day, or every week, the presentation controller may analyze some amount of recent historical data to determine if a relevant change threshold has been reached or exceeded. Alternatively, the presentation controller may initiate a change only after the electronic device 101 is used in one or more particular ways, such as one of the ways that the presentation controller 115 has been configured to consider in making a change to the user interface.

The data storage system 117 may be configured to store the information about the way in which the electronic device 101 has been used by each of multiple users of the electronic device 117 separately from the usage information of the other users (for example, when a different user logs into the device, only information of the usage by that user is employed to determine the manner in which to change the device as described herein). The presentation controller 115 may correspondingly be configured to make changes to the presentation that is made by the user interface 103 in the ways described herein differently for each user based on the separate information about that user's use of the electronic device 101. Thus, different user profiles, which are selectable through the user interface 103, may be stored in the data storage system 117.

The presentation controller 115 may be configured to automatically cause the user interface 103 to make a function that currently cannot be implemented by pressing a key on a virtual keyboard (e.g., only by selecting the function from a menu), able to be implemented by a key on the virtual keyboard, and/or vice versa. This may be done, for example, when historic information in the data storage system 117 indicates that the frequency and/or number of times the function has been used has reached or exceeded a threshold during a pre-determined period prior to the analysis. The time period may be preset, e.g., by the manufacturer of the device or the developer of the software, or the period may be a user setting. The functions that are subject to this type of control may be all or a subset of the functions that are available and/or ones that are specifically specified by a user or the manufacturer. In other words, the presentation controller 115 may be configured to automatically cause the user interface 103 to alter the available functionality offered by the virtual keyboard by swapping the functions provided by keys in pre-determined locations based on historic usage (and limited to optional keys such as non-alphanumeric keys).

The presentation controller 115 may be configured to automatically cause the user interface 103 to change the presentation of a function for selection on the user interface back to the way it was, for example, when new historic information in the data storage system 117 indicates that the frequency and/or number of times the function has been used since a most recent count reset has fallen below a threshold. The threshold for such a change back may be the same or a different threshold as was used for a prior related change, such as a lower threshold.

Figure 7A:
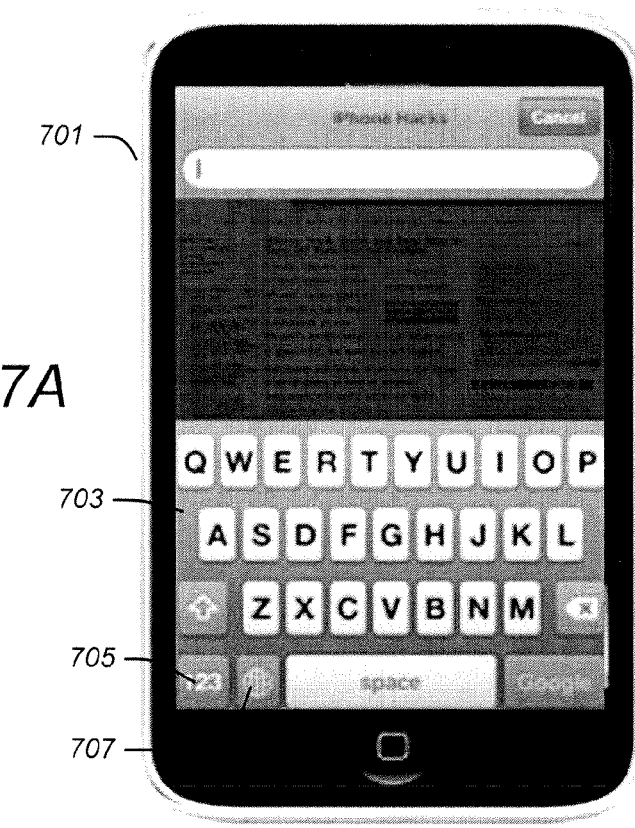
FIGS. 7A and 7B illustrate examples of virtual keys on a virtual keyboard in a smart phone being automatically changed by the presentation controller based on ways in which the touchscreen type smart phone has been used.
Figure 7B:
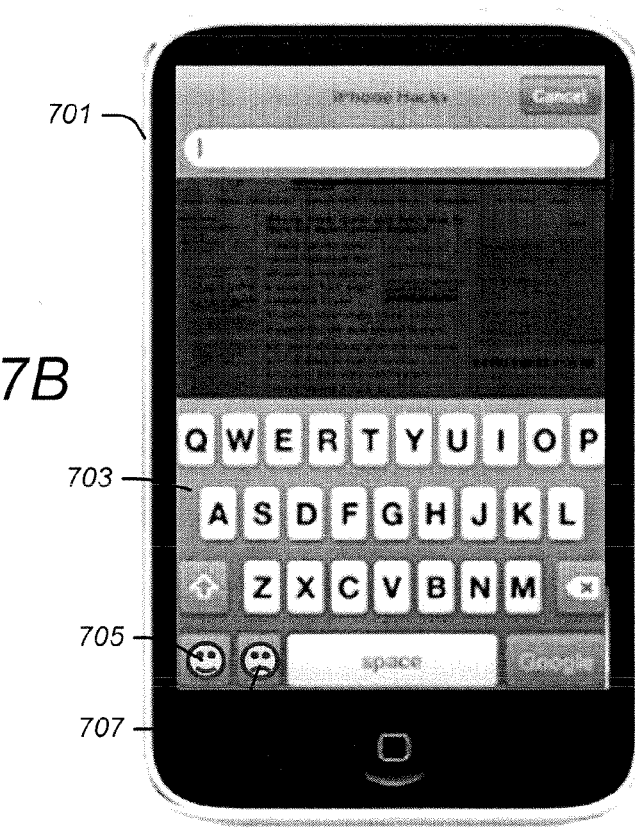

FIGS. 7A and 7B illustrate examples of virtual keys 705 and 707 on a virtual keyboard 703 in a touchscreen type smart phone 701 being automatically changed by the presentation controller 115 based on ways in which the smart phone has been used. As illustrated in FIG. 7A, virtual key 705 represents a numeral function, which when selected causes the device 701 to display numeric functions on some or all of the virtual keys that are shown with letters in FIG. 7A. The illustrative application relates to searches, and the virtual key 707 in FIG. 7A represents a function to search for entered search terms via the generic world wide web (as opposed to a particular search engine such as Google). FIG. 7B shows a device interface configuration in which the function of virtual keys 705 and 707 have changed from 123 and world wide web search, respectively, to emoticons such as a happy and sad face, respectively. This change may have been done by the presentation controller 115, for example, based on historic information in the data storage system 117 indicating that the frequency and/or number of times that the happy and sad faces had been used elsewhere has reached or exceeded a threshold, e.g. using processes like those of FIGS. 5 and 6. For example, if certain emoticons have been used 20-30 times over the last week, this may trigger the emoticons to replace lesser used (but replaceable keys) functions in the higher level screen of the application as shown in FIG. 7A so that the higher level screen is now presented with the emoticons as shown in FIG. 7B. Only a limited number of keys may be replaceable. Moreover, certain keys may not be replaceable, independent of their relative usage, due to the inherent functionality. For example, although the key activating the numerical keypad is shown as being replaced in FIG. 7B, it may not be replaceable—instead, the "Google" key may be replaced by one or more emoticons or by an alternative more often used search engine like "Bing" or "Yahoo." The space previously occupied by the single (Google) key, may instead be taken up by one or two more frequently used keys. These keys may or may not be related (e.g., in this example they may be limited to emoticons or extensions such as .com and .org, or one may be an emoticon while the other is a particular frequently used key, such as .com). In other examples, keys or icons may be rearranged in response to usage detection. These types of changes may be made as soon as the threshold is reached or exceeded, pursuant to a periodic check of thresholds, or in accordance with any other desired approach.

The presentation controller 115 may be configured to automatically cause the user interface 103 to increase the size of a user-selectable control on the user interface. This may be done, for example, when historic information in the data storage system 117 indicates that the recent frequency and/or number of times the user-selectable control has been used has reached or exceeded a threshold. The presentation controller 115 may be configured to automatically cause the size to revert back or to be even smaller, for example, when historic information in the data storage system 117 indicates that the recent frequency and/or number of times the user-selectable function has been used has fallen below the threshold or a different threshold, such as a lower threshold. The size may be changed by an amount that tracks the frequency or number of times of use. These changes may be made on a continual basis (e.g., after every use), in only discrete, pre-determined incremental steps (e.g., after a set number of uses, the size changes by a predetermined amount, which may further be adjusted as the size reaches a particular display limitation), and/or with a font size not to go below a minimum or above a maximum (limited, e.g., by viewability and/or ability to fit within the constraints of the display). For example, an answer button is typically able to be enlarged more than a key on a keyboard. Whether continuous or incremental, speed of change may also be limited, for example, to a rate a designer may deem a maximum rate that might be considered comfortable for expected users. In an example like that of FIGS. 7A and 7B, where functions and/or keys are moved to and from a virtual keyboard, keys may also change in size, e.g., to shrink the "Google" key or space bar to increase the room on the displayed virtual keyboard to add more keys or make other keys larger, for the more frequently selected functions.

Figure 8A:
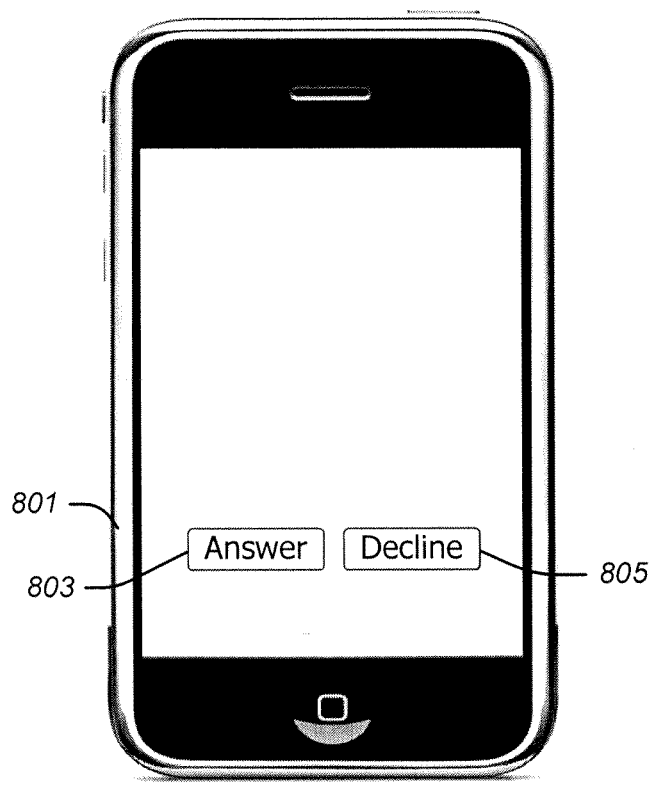
FIGS. 8A and 8B illustrate examples of the size of a virtual Answer key and a virtual Decline key in a smart phone being automatically changed by the presentation controller based on the way in which the touchscreen type smart phone has been used.
Figure 8B:
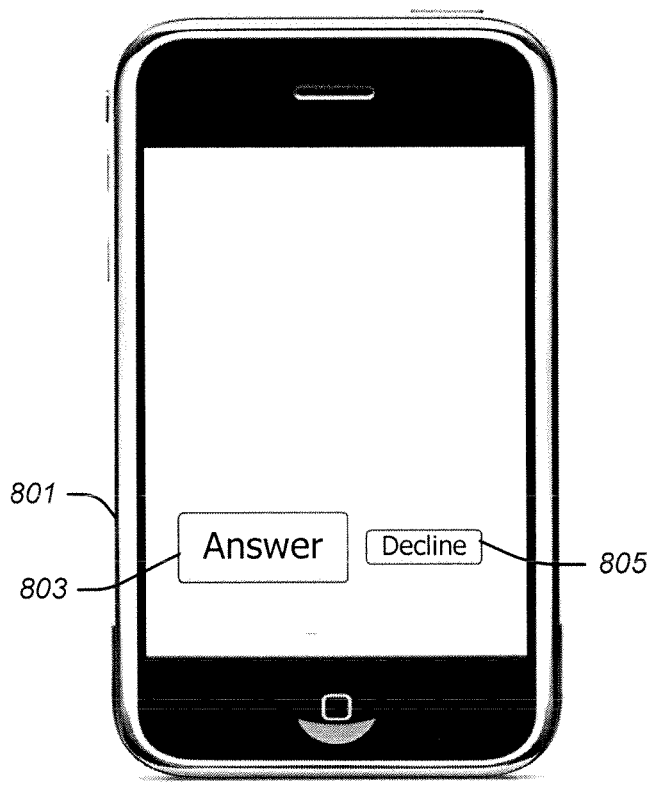

FIGS. 8A and 8B illustrate two virtual key examples in which the size of a virtual Answer key 803 and a virtual Decline key 805 in a smart phone 801 are automatically changed by the presentation controller 115 based on the way in which the smart phone 801 has been used. As illustrated in FIGS. 8A and 8B, the Answer key 803 has been enlarged, while the Decline key 805 has been reduced in size. This may have been done by the presentation controller 115, for example, based on historic information in the data storage system 117 indicating that frequency and/or number of times the Answer key 803 has been used has reached or exceeded a threshold, while the frequency and/or number of times the Decline key 805 has fallen below a lower threshold. Each of these thresholds, for example, may be a percentage of the total number of calls have been received over a pre-determined period. For certain keys, such as the Answer key 803 and the Decline key 805, whose functionality is inherently coupled and appear on the same screen, the sizes of these keys may be linked such that as one key increases in size, the other correspondingly decreases. In other embodiments, however, the size change of each such key may be independent such that the size change depends on the number of times activated/ frequency of activation or percentage of selection in relation to the other key.

The presentation controller 115 may be configured to automatically cause the user interface 103 to change the level of a menu choice in a hierarchical menu. This menu level change may be done, for example, when historic information in the data storage system 117 indicates that the frequency and/or number of times the menu choice has recently been used has reached or exceeded a threshold. The presentation controller 115 may be configured to automatically cause the user interface 103 to change the level of the menu choice back to the original level or to an even lower level, for example, when new historic information in the data storage system 117 indicates that the frequency and/or number of times the menu choice has been used since a recent count reset has fallen below the threshold or below a different threshold, such as a lower threshold.

Figure 9A:
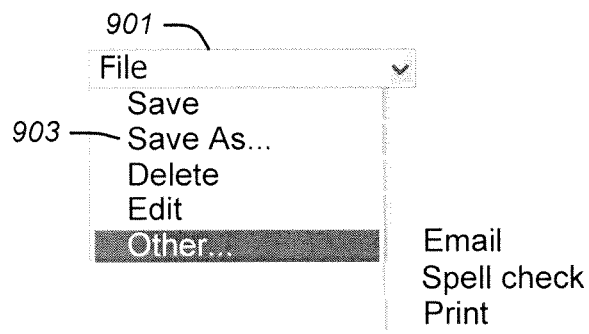
FIGS. 9A and 9B illustrate examples of the position of a menu choice in a hierarchical menu in an electronic device being automatically changed by the presentation controller based on the way in which the electronic device has been used.
Figure 9B:
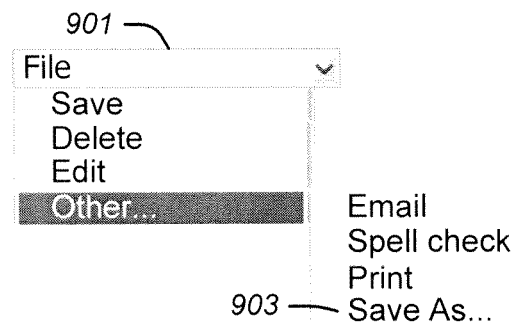

FIGS. 9A and 9B illustrate examples of the position of a menu choice 903 in a hierarchical menu 901 in an electronic device being automatically changed by the presentation controller 115 based on the way in which the electronic device has been used. In this example, the "Save as . . . " choice is move down to a lower level of the menu hierarchy based on lower usage of that function. This menu change may have been done by the presentation controller 115, for example, based on historic information in the data storage system 117 indicating that the frequency and/or recent number of times the "Save As . . . " menu choice has been used has fallen below a threshold. The presentation controller 115 may be configured to return the menu choice 903 to its original position (FIG. 9A) when new historic information in the data storage system 117 indicates that the frequency and/or number of times the menu choice 903 has recently been used has reached or exceeded the threshold or a different, higher threshold. A higher threshold may be employed to prevent the menu choice from being moved again in response to only slight changes in its usage rate. The commands that are subject to this type of shifting may be all of the commands in the menu structure or only certain ones that are specified by a user or the manufacturer. Different thresholds may also be applied to different menu commands. The choices in the menu may all concern different operations within the same application or different operations in different applications, or the launching of different applications. In the example, the "Save as . . . " function was moved based on its own historical usage; however, similar moves may be made due to usage of another function or a combination of usage levels of two or more functions, e.g., so that one function is moved up in the hierarchy as another function is moved down.

The same type of level change for a menu choice in a hierarchical menu may be made by the presentation controller 115 when the usage detection system 119 detects that a menu choice has failed, such as when the menu choice is an application launch icon that is configured to launch an application, but fails to do so. In this situation, the presentation controller 115 may be configured to move the menu choice to the bottom of the menu hierarchy when the usage detection system 119 detects that the application did not launch. The presentation controller 115 may be configured to later return the menu choice to its previous level when the usage detection system 119 later detects that it is working, such as after having been repaired.

Although discussed here in terms of a menu example, similar usage detection and configuration changes may be applied to function or application icons displayed on various screens. For example, icons may be moved to different pages of a home screen of a smart phone and/or moved between a home screen and folder, based on history of usage much like the position changes in the menu structure in the example of FIGS. 9A and 9B.

The presentation controller 115 also may be configured to automatically cause the user interface 103 to change the function that is assigned to a mechanical switch, commonly referred to as a "soft button" or "soft key." This change of function for a mechanical switch may be done, for example, when historic information in the data storage system 117 indicates that the frequency and/or number of recent times that the new function has been used has reached or exceeded a threshold. The presentation controller 115 may be configured to automatically cause the user interface 103 to automatically cause the function to change back when the recent level of this use falls below the same or a different threshold, such as a lower threshold. Again, a lower threshold may be used to prevent the changes from being too frequent.

Figure 10A:
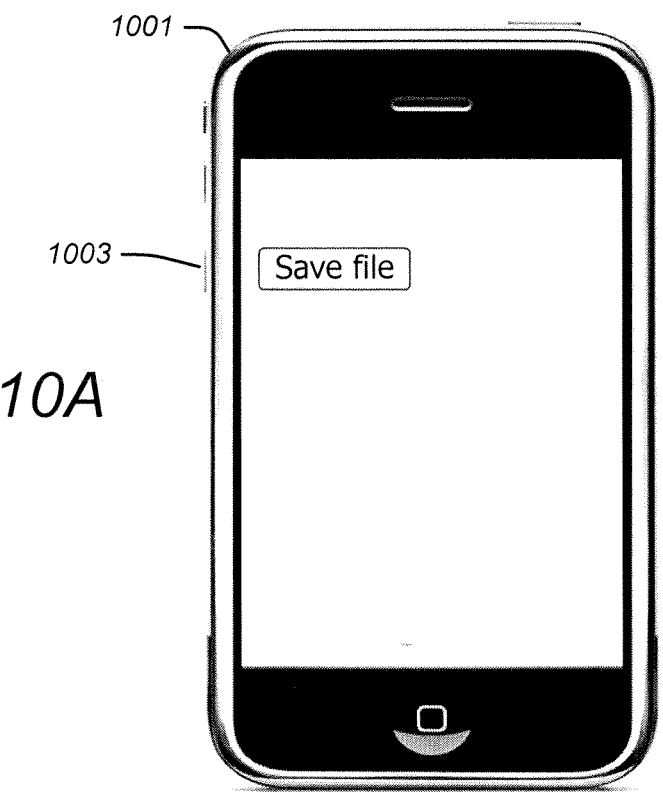
FIGS. 10A and 10B illustrate examples of the function of a mechanical switch in an electronic device being automatically changed based on the way in which the electronic device has been used.
Figure 10B:
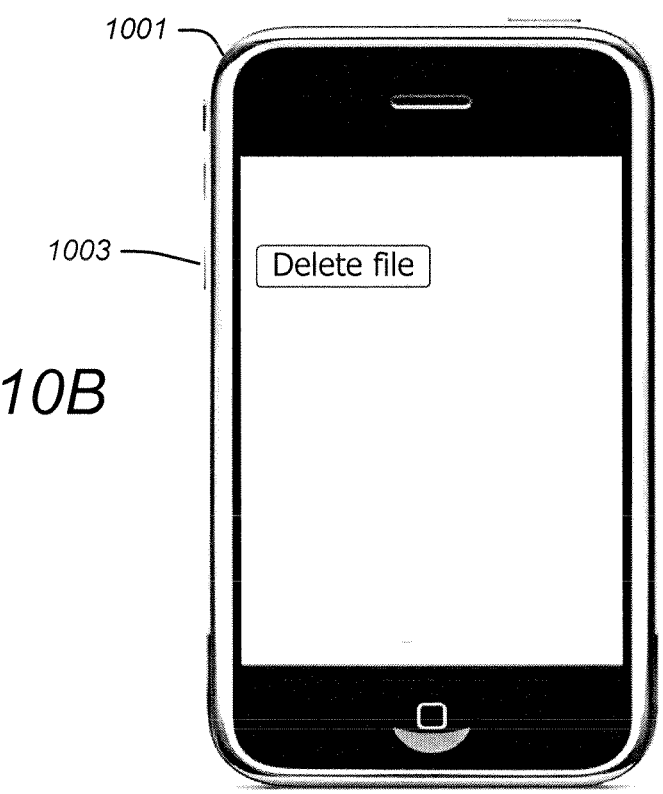

FIGS. 10A and 10B illustrate examples of the function of a mechanical switch 1003 in an electronic device 1001 being automatically changed based on the way in which the electronic device has been used. As illustrated in FIGS. 10A and 10B, the function of the mechanical switch 1003 has been changed from "Save file" to "Delete file." This may have been done by the presentation controller 115, for example, based on historic information in the data storage system 117 indicating that the frequency and/or number of recent times the "Save file" function has been used has reached or exceeded a threshold or has been less than the frequency and/or number of times the "Delete file" function has been used.

In many handheld electronic devices, selectable functions are represented on the display as functional objects. Several of the earlier examples illustrated or described examples of functional objects including icons, buttons and bars, or the like, each of which represents and allows a user to select a different device operation or a different executable application that itself selectively performs a different set of functions. By contrast, web links in a browser, for example, would provide selection of different addresses; although the function of sending a query to obtain an addressed page upon selection of any of a set of displayed links would be the same. For example, a presentation controller in several of the earlier examples causes the device to display functional objects on a display of the electronic device, in an arrangement oriented in correspondence to current orientation of the electronic device, and at positions within the arrangement in accordance with the way in which the electronic device has been used without adjusting an orientation of the entire display. Each displayed functional object represents a different function to be performed by the electronic device in response to user selection of the respective functional object from the displayed arrangement. The presentation controller automatically initiates a change positions of functional objects or replacement of one or more of the functional objects with at least one previously unavailable functional object, within the displayed arrangement still oriented to correspond to the current orientation of the electronic device, responsive to detection of a change in the way the electronic device currently is being used.

As discussed above with regard to FIGS. 1 and 1A, the electronic device 101, including the presentation controller 115 and the usage detection system 119, include various hardware and software components. The hardware for such a device, the presentation controller 115, and the usage detection system 119 include one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touchscreens). The electronic device 101, including the presentation controller 115 and the usage detection system 119, may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the electronic device, as described herein. The description of each function that is performed by each device or component also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, the presentation controller 115 may or may not be configured to automatically change the orientation of an electronic display to match the current orientation of the electronic device. The presentation controller 115 may or may not be configured to automatically change the appearance of a user-selectable control on a display following the selection of any user-selectable control.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. An interface controller in an electronic device, the interface controller comprising:
   a usage detection system, including a sensor, wherein the usage detection system is configured to:
      detect a way in which the electronic device is being or has been used; and
      cause information about the way in which the electronic device has been used to be stored in a data storage system of the electronic device; and
   a presentation controller, responsive to the usage detection system, configured to:
      automatically change the way in which a first function is presented for selection as a menu choice in a hierarchical menu of application operations by a user interface controlled by the interface controller when the electronic device is being or has been used in one or more particular ways based on the information in the data storage system, other than to merely change the:
         orientation of an electronic display to match the current orientation of the electronic device;
         placement of web links on a frequently used page or a frequently used menu; or
         appearance of a user-selectable control on a display following the selection of any user-selectable control;
      automatically change a level of the menu choice in the hierarchical menu from an original level to a lower level, wherein the original level is higher than the lower level, when the information in the data storage system indicates that a frequency, number of times, or percentage the menu choice has been selected in comparison with the selection of one or more other menu choices has reached or fallen below a first threshold indicating lower usage of the menu choice relative to the other menu choices;
      present an application launch icon as the menu choice;
      detect failure of an application linked to the application launch icon presented as the menu choice;
      upon detecting failure of the application linked to the application launch icon, automatically change the level of the application launch icon presented as the menu choice in the hierarchical menu by moving the menu choice to a bottom of the hierarchical menu; and
      in response to detecting that the application has been repaired, return the application launch icon as the menu choice in the hierarchical menu and to a previous level that the application launch icon was presented in the hierarchical menu before failure was detected.

2. The interface controller of claim 1 wherein the electronic device is a hand-held electronic device and:
   the usage detection system is configured to detect whether the left or right hand of a user is holding the electronic device; and
   the presentation controller is configured to automatically change the way in which a second function is presented for selection based on whether the detected left or right hand is holding the electronic device.

3. The interface controller of claim 1 wherein:
   a second function is presented as a user-selectable control on one side of a display; and
   the presentation controller is configured to automatically change the side of the display on which the user-selectable control is presented for selection when a user is holding the electronic device in a hand that is on the same side of the user's body as the side of the display on which the user-selectable control is presented.

4. The interface controller of claim 3 wherein the user-selectable control is a virtual button that causes the electronic device to answer an incoming phone call when activated.

5. The interface controller of claim 1 wherein the presentation controller is configured to change the way in which the first function is presented for selection when the information in the data storage system indicates that the percentage the electronic device has been used in the particular way in comparison with one or more other ways has reached or exceeded the first threshold.

6. The interface controller of claim 1 wherein the presentation controller is configured to change back the way in which the first function is presented for selection from the lower level to the original level when the information in the data storage system indicates that the frequency, number of times, or percentage the electronic device has been used in the particular way has not reached or exceeded a second threshold that is different from the first threshold.

7. The interface controller of claim 1 wherein the presentation controller is configured to change back the level of the menu choice in the hierarchical menu from the lower level to the original level when the information in the data storage system indicates that the frequency, number of times, or percentage the electronic device has been used in a particular way has reached or exceeded a second threshold that is different from the first threshold.

8. The interface controller of claim 1 wherein:
   the user interface is configured to controllably present a second function for selection as a key choice on a virtual keyboard or as a choice that is not a key choice on the virtual keyboard; and
   the presentation controller is configured to automatically cause the user interface to change the way the second function is presented for selection from the way that is not a key choice to the key choice or vice versa when the information in the data storage system indicates that the frequency, number of times, or percentage the function has been used has reached or exceeded the first threshold.

9. The interface controller of claim 8 wherein the presentation controller is configured to change the way in which the second function is presented when the information in the data storage system indicates that the percentage the electronic device has been used in the particular way in comparison with one or more other ways has reached or exceeded the first threshold.

10. The interface controller of claim 8 wherein the presentation controller is configured to automatically change back the way function is presented for selection to the original level when the information in the data storage system indicates that the frequency, number of times, or percentage the function has been used has not reached or exceeded a second threshold that is different from the first threshold.

11. The interface controller of claim 1 wherein:
   the first function is presented as a user-selectable control on a display in the electronic device; and
   the presentation controller is configured to automatically change the size of the user-selectable control when the information in the data storage system indicates that the frequency, number of times, or percentage the user-selectable control electronic device has been selected has reached or exceeded the first threshold.

12. The interface controller of claim 11 wherein the presentation controller is configured to automatically change the size of the user-selectable control when the information in the data storage system indicates that the percentage the user-selectable control has been selected in comparison with one or more other user-selectable controls has reached or exceeded the first threshold.

13. The interface controller of claim 11 wherein the presentation controller is configured to change back the size of the user-selectable control when the information in the data storage system indicates that the frequency, number of times, or percentage the first function has been used has not reached or exceeded a second threshold that is different from the first threshold.

14. The interface controller of claim 1 wherein:
the user interface includes a programmable mechanical switch; and
the presentation controller is configured to automatically change a second function that the mechanical switch is programmed to select to a third function when the information in the data storage system indicates that the frequency, number of times, or percentage the mechanical switch has been operated has reached or exceeded the first threshold.

15. The interface controller of claim 14 wherein the presentation controller is configured to automatically change the second function that the mechanical switch is programmed to select when the information in the data storage system indicates that the percentage the mechanical switch has been operated in comparison with the operation of one or more other user controls has reached or exceeded the first threshold.

16. The interface controller of claim 14 wherein the presentation controller is configured to automatically change back to the second function from the third function that the mechanical switch is programmed to select when the information in the data storage system indicates that the frequency, number of times, or percentage the mechanical switch has been operated has not reached or exceeded a second threshold that is different from the first threshold.

17. The interface controller of claim 1 wherein:
the user usage detection system is configured to detect when a user selects a second function on the user interface and the selected second function does not work; and
the presentation controller configured to change the way in which the second function is presented on the user interface based on whether the function works.

18. The interface controller of claim 17 wherein:
the second function is presented for selection as the menu choice in the hierarchical menu; and
the presentation controller is configured to automatically change the level of the menu choice in the hierarchical menu based on whether the second function works or does not work.

19. The interface controller of claim 1 wherein:
the usage detection system includes an orientation sensor configured to detect the orientation of the electronic device; and
the presentation controller is configured to automatically change the way in which a second function is presented on the user interface based on the orientation of the electronic device.

20. A non-transitory, tangible, computer-readable storage medium containing a program of instructions configured to cause a computer system in an electronic device running the program of instructions to:
detect a way in which the electronic device is being or has been used;
cause information about the way in which the electronic device has been used to be stored in a data storage system of the electronic device;
automatically change the way in which a function is presented for selection as a menu choice in a hierarchical menu of application operations by a user interface in the electronic device based on the way in which the electronic device is being or has been used based on the information in the data storage system, other than to merely change the:
orientation of an electronic display to match the current orientation of the electronic device;
placement of web links on a frequently used page or a frequently used menu; or
appearance of a user-selectable control on a display following the selection of any user-selectable control;
automatically change a level of the menu choice in the hierarchical menu from an original level to a lower level, wherein the original level is higher than the lower level, when the information in the data storage system indicates that a frequency, number of times, or percentage the menu choice has been selected in comparison with the selection of one or more other menu choices has reached or fallen below a first threshold indicating lower usage of the menu choice relative to the other menu choices;
present an application launch icon as the menu choice;
detect failure of an application linked to the application launch icon presented as the menu choice:
upon detecting failure of the application linked to the application launch icon, automatically change the level of the application launch icon presented as the menu choice in the hierarchical menu by moving the menu choice to a bottom of the hierarchical menu; and
in response to detecting that the application has been repaired, return the application launch icon as the menu choice in the hierarchical menu and to a previous level that the application launch icon was presented in the hierarchical menu before failure was detected.

21. The interface controller of claim 7, wherein the second threshold that is different from the first threshold prevents the menu choice from being moved again in response to only slight changes in usage rate of the menu choice.

22. The interface controller of claim 21, wherein the second threshold is varied depending on a menu command type of the menu choice in the hierarchical menu.

23. The non-transitory, tangible, computer-readable storage medium of claim 20, wherein the program of instructions is further configured to cause the computer system in the electronic device running the program of instructions to:
change back the way in which the first function is presented for selection from the lower level to the original level when the information in the data storage system indicates that the frequency, number of times, or percentage the electronic device has been used in the particular way has not reached or exceeded a second threshold that is different from the first threshold.

* * * * *